United States Patent [19]

Roberts

[11] 4,275,938
[45] Jun. 30, 1981

[54] TANDEM THRUST BEARING

[75] Inventor: Leo L. Roberts, Claremore, Okla.

[73] Assignee: Centrilift-Hughes, Inc., Tulsa, Okla.

[21] Appl. No.: 96,344

[22] Filed: Nov. 21, 1979

[51] Int. Cl.³ .......................................... F16C 17/04
[52] U.S. Cl. .................................... 308/162; 308/139
[58] Field of Search .................. 308/162, 139 R, 161, 308/135, 158, 227, 229, 164

[56] References Cited

U.S. PATENT DOCUMENTS

| | | | |
|---|---|---|---|
| 2,908,534 | 10/1959 | Rietsch | 308/162 |
| 3,043,637 | 7/1962 | Biedendieck et al. | 308/162 |
| 3,858,668 | 1/1975 | Bell | 308/162 |
| 4,033,647 | 7/1977 | Beavers | 308/227 |

Primary Examiner—Lenard A. Footland
Attorney, Agent, or Firm—Robert A. Felsman

[57] ABSTRACT

A tandem thrust bearing arrangement associated with a rotating shaft which is subjected to an axial load having spaced first and second annular members or thrust runners fixed to the shaft and first and second thrust bearings associated with the respective annular members and means axially movable with respect to the shaft supporting one of the thrust bearings which activates pivotable means applying load to the other thrust bearing.

3 Claims, 2 Drawing Figures

TANDEM THRUST BEARING

BACKGROUND OF THE INVENTION

The use of thrust bearings to carry the imposed load on a substantially vertical shaft is well known in the art. As imposed loads on the shaft are increased, it becomes necessary to construct large thrust bearings. Thus, housings in which the shaft is journeyed must be larger to house the shaft-thrust bearing assembly.

One solution to the problem of providing a relatively compact shaft-thrust bearing assembly is taught in the U.S. Pat. No. 4,033,647 granted July 5, 1977 to John A. Beavers. The Beavers patent teaches a tandem thrust bearing assembly in which a second thrust bearing carries load in excess of the load which can be carried by a first thrust bearing.

THE INVENTION

The present invention relates to a series or tandem thrust bearing arrangement which, as in the aforementioned Beavers patent, provides an increase in load capacity without increasing the physical size of the thrust bearing assembly for the same load capacity. Unlike the Beavers arrangement, the present invention provides a tandem thrust bearing arrangement in which each thrust bearing carries a part of the load at any given time.

The thrust bearing arrangement according to this invention comprises a first thrust runner fixed to a shaft upon which load is imposed, a first thrust bearing, an annular member surrounding the shaft and axially movable with respect thereto, which annular member supports the first thrust bearing, a second thrust runner fixed to the shaft and spaced vertically from the first thrust runner, a second thrust bearing for the second thrust runner, a support for the second thrust bearing, and means to transfer thrust from the first thrust bearing to the second thrust bearing. The last mentioned means comprises pivoted wing-like members, one arm of which is contacted by the annular member and another arm of which contacts the axially movable support for the second thrust bering. When load is imposed on the first thrust bearing, the annular member moves to pivot the pivots and transfers load to the support for the second thrust bearing and then to the second thrust bearing. When the load is relaxed, the opposite occurs.

THE DRAWING

DETAILED DESCRIPTION

Figure 1:
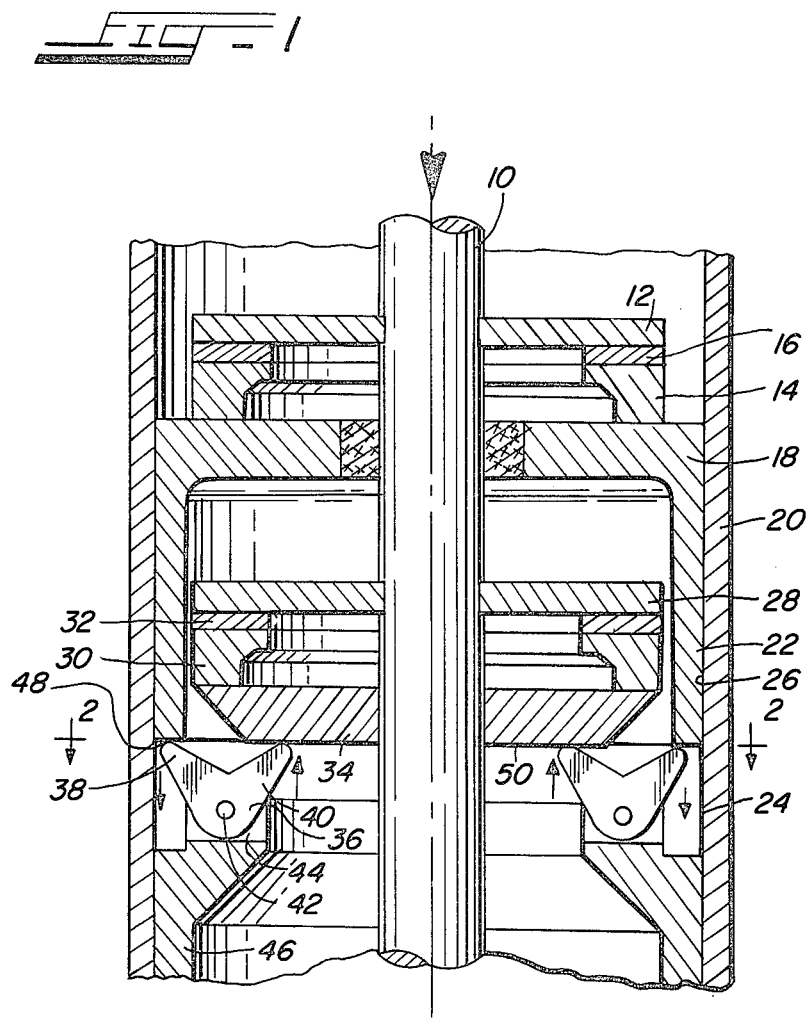
FIG. 1 is a partial sectional view illustrating the invention.
Figure 2:
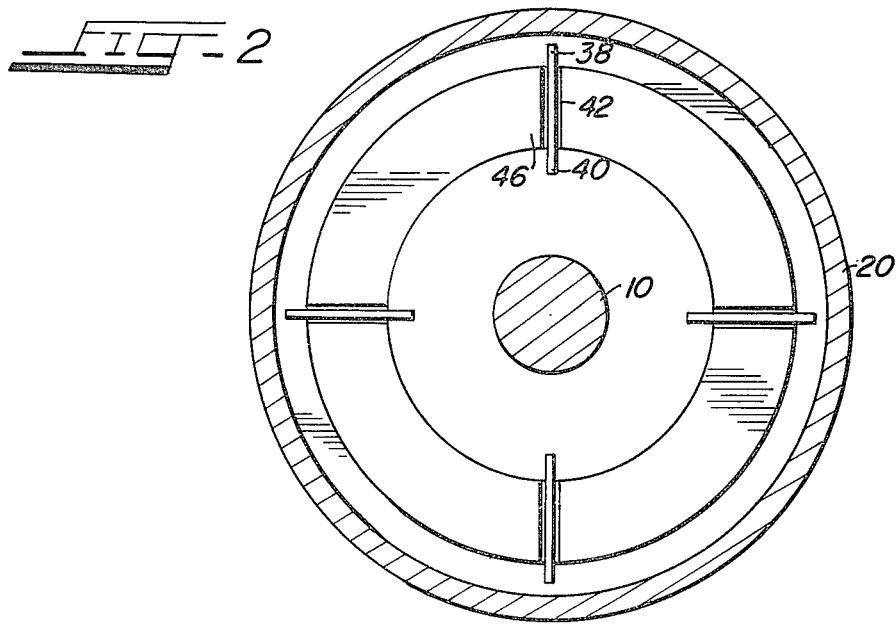
FIG. 2 is a sectional view taken on line 2—2 of FIG. 1.

Looking now at the drawings, there is shown a tandem thrust bearing arrangement comprising a shaft 10 which has downwardly directed load imposed thereon, a first thrust runner plate 12 fixed to the shaft 10, and a first annular thrust bearing 14 vertically below the runner plate 12, with an annular thrust runner 16 between the plate 12 and the bearing 14. The thrust bearing arrangement further comprises an annular supporting member 18 which supports the bearing 14 and is movable with respect to the shaft 10 and within a cylindrical housing 20, the member 18 having a cylindrical flange 22; the outer surface 26 of which contacts the inner surface 24 of the housing 20. A second thrust runner plate 28 is fixed to the shaft 10 and is vertically spaced from the first plate 12. A second annular thrust bearing 30 is located vertically below the plate 28 with an annular thrust runner 32 disposed between the bearing 30 and the plate 28. The bearing 30 is supported on an annular member 34 which is vertically slidable with respect to the shaft 10.

Below the member 34 are a plurality, generally three or more, of wing-like pivots or fulcrums 36 each having a pair of arms 38, 40 angularly oriented with respect to each other. The pivots 36 are each supported on a pivot 42 supported by an annular part 44 of a generally cylindrical member 46 located within the housing 20 and in a fixed vertical position.

The arms 38 of the fulcrums of pivots 36 contact the lower surface 48 of the cylindrical flange 22 while the arms 40 contact the lower surface 50 of the support 34.

As can be seen, load on the shaft 10 causes downward movement of the support 18 which through the pivots 36 causes upward movement of the support 34; thus load is imposed on the lower thrust bearing 30 when load is imposed on the upper thrust bearing 14.

The tandem arrangement, a relatively simple assembly, permits an increase in load capacity of the bearing assembly without increasing the diameter of the bearing assembly.

I claim:

1. A tandem thrust bearing arrangement for a rotating shaft comprising:
    a first thrust runner fixed to the shaft;
    a first thrust bearing for the first thrust runner,
    an annular member surrounding the shaft supporting said first thrust bearing and axially movable with respect to said shaft;
    a second thrust runner fixed to the shaft and spaced from the first thrust runner;
    a second thrust bearing for the second thrust runner; and
    means supporting said second thrust bearing and axially movable by said annular member in response to axial movement of said annular member to transfer load to the second thrust bearing.

2. A tandem thrust bearing as recited in claim 1 wherein said last-named means comprises a second annular member surrounding said shaft and further comprising means for axially moving said second annular member.

3. A tandem thrust bearing as recited in claim 2 wherein said means for axially moving said second annular member comprise pivotable members having arms, one of which contacts said first-named annular member and the other of which contacts said second annular member.

* * * * *